INVENTOR:
Douglas A. Moore
By Willard M. Graham
Agent.

April 10, 1962 D. A. MOORE 3,028,767

DRIVE MECHANISM

Filed July 26, 1960 2 Sheets-Sheet 2

Motor Rotation is CW when A is (+) Positive & B is Negative (-)
Motor Rotation is CCW when B is (+) Positive & A is Negative (-)

INVENTOR:
Douglas A. Moore

By Willard M. Graham
Agent.

United States Patent Office 3,028,767
Patented Apr. 10, 1962

3,028,767

DRIVE MECHANISM

Douglas A. Moore, Rolling Hills, Calif., assignor to Northrop Corporation, Beverly Hills, Calif., a corporation of California Filed July 26, 1960, Ser. No. 45,483
5 Claims. (Cl. 74—665)

This invention relates to drive mechanisms and more particularly to a gear train enabling rotational movement of a single prime mover to be imparted independently to either of a pair of spaced rotatable assemblies.

The drive mechanism as disclosed herein embodies features rendering it especially useful in driving the take-up reels of any type of recording or reproducing apparatus incorporating at least a pair of take-up reels which must be independently driven. Accordingly the present drive mechanism is shown and described herein in connection with audio reproducing apparatus of the type disclosed in a copending application of Vogel et al., Serial Number 816,948, filed May 29, 1959; however, it should be understood that it may be utilized in other types of apparatus in which drive means is required to independently drive a pair of spaced rotatable assemblies.

In audio reproducing apparatus of the type disclosed in the aforementioned copending application it is important, in fact essential, that a smooth continuous movement, free of vibrations and the like, must be imparted to signal carrying components of the apparatus if the signals are to be clear, distinct and faithfully reproduced.

Accordingly it is an object of the present invention to provide a drive mechanism for dual audio reproducing and like apparatus adapted to independently drive one and then the other of a pair of spaced take-up reels of the apparatus.

Another object is to provide a drive mechanism for dual audio reproducing and like apparatus adapted to impart smooth and continuous movement to the signal carrying components of the apparatus.

Another object is to provide a drive mechanism for audio reproducing and like apparatus which is simple in design, efficient in operation, economical to manufacture and which may be easily adapted to any purpose for which it is intended.

Although the characteristic features of the present invention are particularly pointed out in the appended claims, the invention itself, also the manner in which it may be carried out, will be better understood by referring to the following description taken in connection with the accompanying drawings forming a part of this application and in which:

Figure 2:
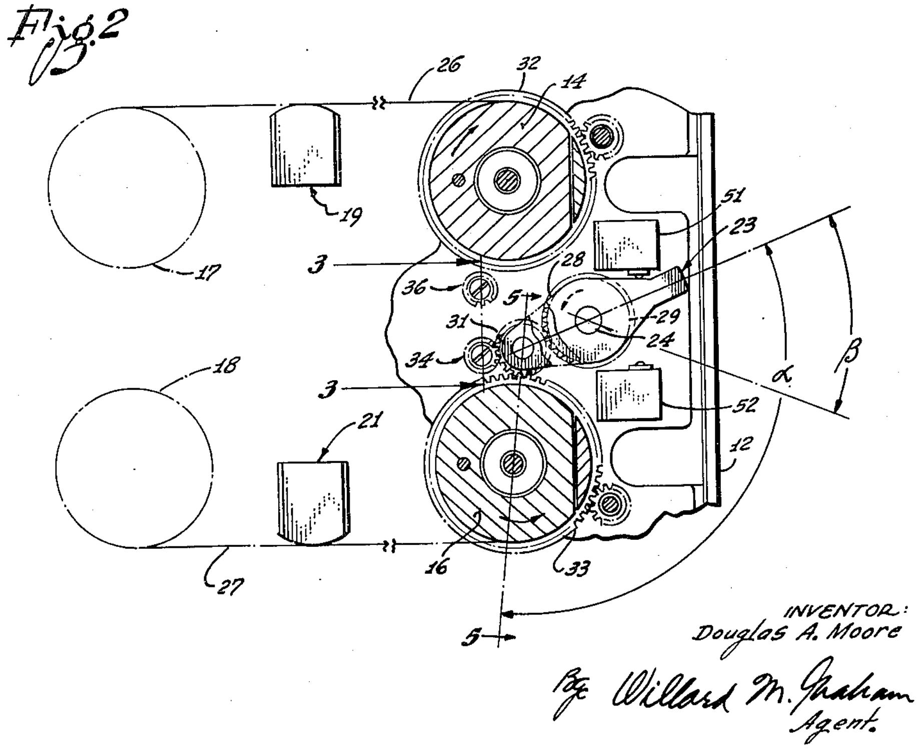
FIGURE 2 is a fragmentary sectional view taken on the line 2—2 of FIGURE 1.
Figures 3, 4, 5:
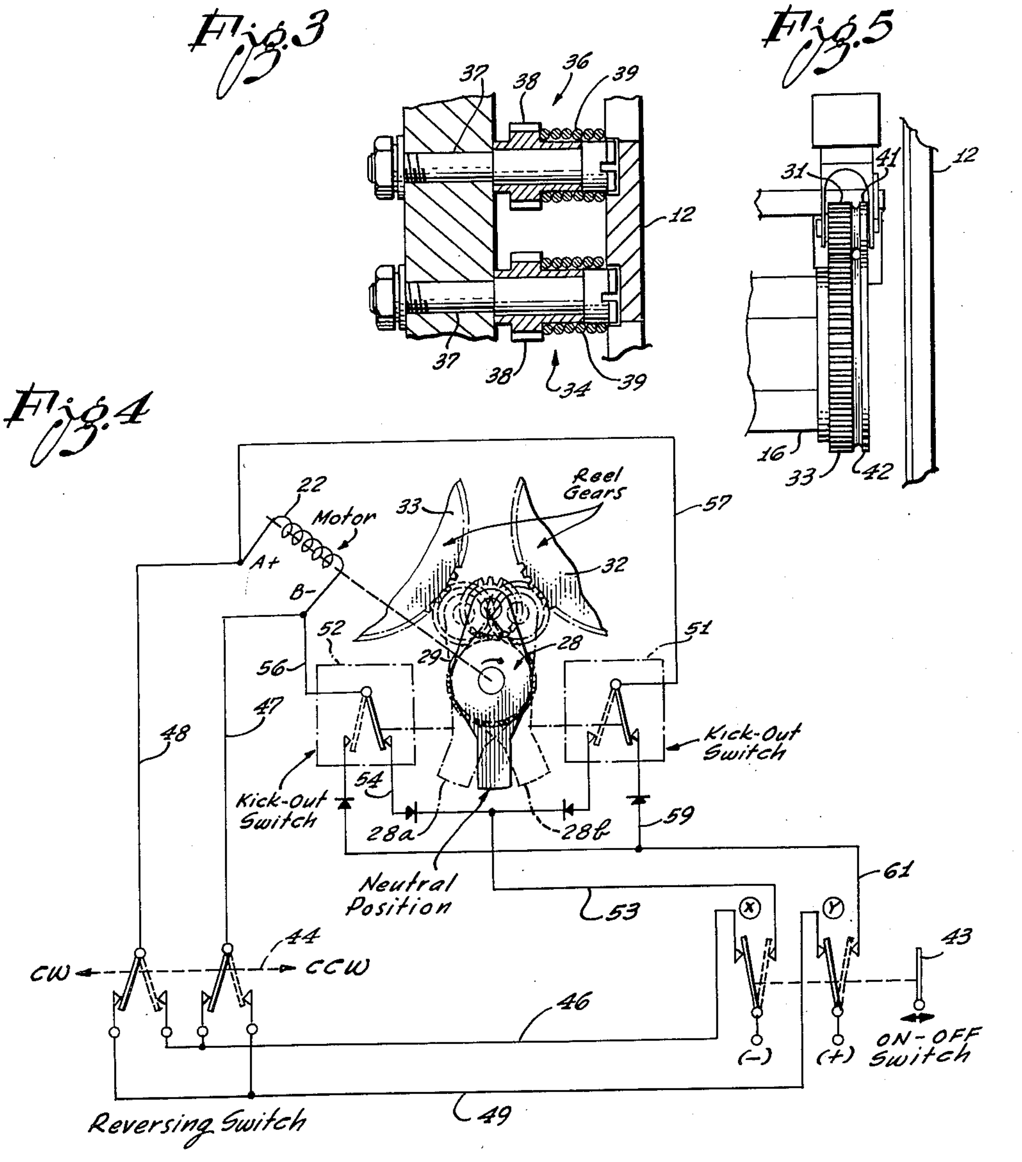

FIGURES 3 and 5 are fragmentary sectional views taken on the lines 3—3 and 5—5, respectively, of FIGURE 2.

Figure 1:
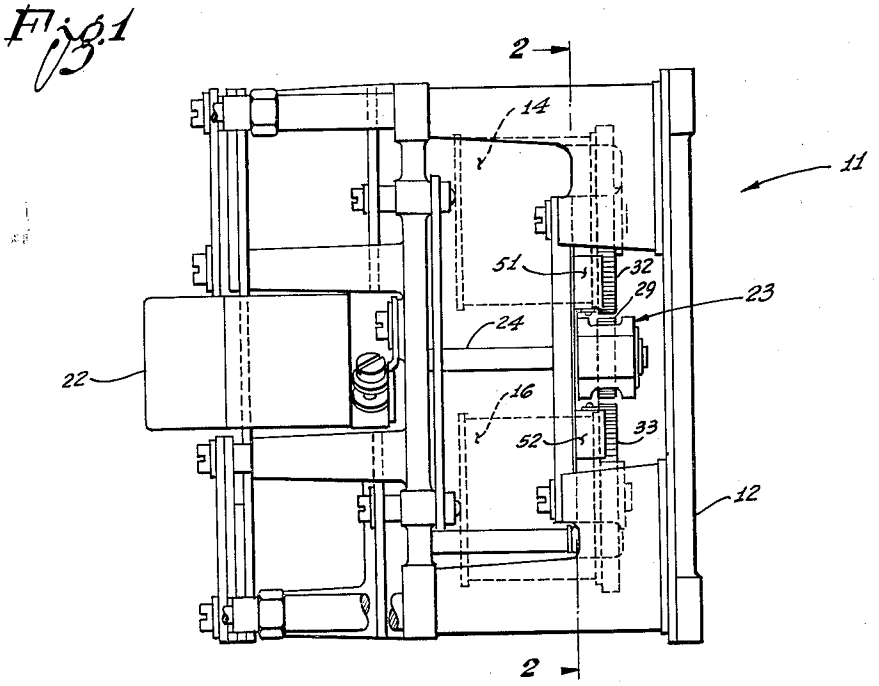
FIGURE 1 is a side elevational view of a dual audio reproducing apparatus utilizing a drive mechanism of the type disclosed herein.

FIGURE 4 is a schematic view showing an electrical circuit adapted to control the operation of the apparatus shown in FIGURE 1.

Referring now to the drawings, multiple warning apparatus, similar to that shown and described in the aforementioned copending application, is shown in FIGURE 1 and is generally identified by the numeral 11. This apparatus may be installed in an aircraft and in such an installation functions to warn and instruct a pilot regarding emergencies and malfunctions which may occur in his aircraft.

The apparatus 11 includes a frame 12 on which a pair of take-up reels 14 and 16, a pair of rewind reels 17 and 18 (shown in phantom construction in FIGURE 2), a pair of magnetic head assemblies 19 and 21, a reversible type electric motor 22 and the drive mechanism 23 of the type disclosed herein. The motor 22, acting through its output shaft 24, functions to impart clockwise and counterclockwise movements to the drive mechanism 23.

Magnetic recording tapes 26 and 27, approximately forty-five (45) inches long, one and one-half (1½) inches wide, one and one-half (1½) mils thick and each carrying a plurality of messages, are wound between the reels 14 and 17 and between the reels 16 and 18, respectively. The motor 22 and mechanism 23 cooperate to drive the reels 14 and 16 to wind the tapes on the latter reels while spring means (not shown) are utilized to rewind the tapes on the reels 17 and 18.

The drive mechanism 23 is characterized by including a yoke member 28 of bifurcated construction as best seen in FIGURES 1 and 2. The member 28 is journalled on the outer end of the shaft 24 for free rotation thereon and its construction permits the mounting of drive and idler gears 29 and 31, respectively, between the sides thereof. The drive gear 29 is keyed to the shaft 24 and, therefore, moves with the shaft while the yoke member 28 is pivotally moved through an angular range—to be described presently—by friction occurring between the yoke member 28 and shaft 24. The idler gear 31 is mounted for free rotational movement in the forward end of the member 28 so that the teeth of the gears 29 and 31 are in mesh at all times.

Reel gears 32 and 33 are fixedly secured to the outboard ends of the reels 14 and 16, respectively, and are further characterized in that they are aligned with the idler gear 31. It will now be seen that the yoke member 28 may pivot through an angle $\beta$, the angle $\beta$ is hereinafter referred to as the angular range of the yoke member 28. It will also be seen that at such times as the member 28 is at one extreme end of its angular travel (FIGURE 2) the gear 31 will be in mesh with the gear 33 and, when in the other extreme end of its angular travel, it will be in mesh with the gear 32. All intermediate positions of the member 28, that is positions of the yoke member in which the gear 31 is not meshing with either of the gears 32 or 33, are referred to as neutral positions of the yoke member 28. Thus it will be seen that one or the other of the take-up reels 14 or 15 will be driven at such times as the yoke member 28 is located in the extreme ends of its angular range.

Closure forces aiding in bringing the idler gear 31 into firm meshing relationship with the reel gears 32 and 33 are provided by restraining torques of the tape transport, that is, friction and tension of the tape transport. These closure forces are directly proportional to the restraining torque of the tape transport and also are proportional to the angle of mesh of the idler gear 31 with respect to a reel gear as indicated by the Greek letter $\alpha$ in FIGURE 2.

Reversing the motor 22 retracts the idler gear 31 from the reel gear with which it is presently in mesh. Further rotation of the motor 22, in a reverse direction, rotates the gear mechanism 23 until the idler gear meshes with the other one of the reel gears. During the operation just described, tape tension and the aforementioned rewind spring means (not shown) may combine to provide a force acting to reverse the drive reel at a greater speed than that imparted to the drive reel by the motor 22. Accordingly a force or overhauling load may be created which tends to maintain the idler gear in mesh with the take-up reel gear from which it is trying to free itself. To overcome this objectional feature a pair of unidirectional clutch assemblies 34 and 36 are provided. Each of the clutch assemblies 34 and 36 includes bolts, retractor gears 38, and spirally wound springs 39 mounted and assembled as shown in FIGURE 3. The clutch assemblies 34 and 36 constitute conventional clutch means in which the springs 39 coact with the bolts 37 and gears 38 to allow free rotational movement of the gears 38 in one direction and effectively arrest their rotational movement in a reverse direction. The clutch assemblies 34 and 36 are mounted adjacent the perimeter of the reel gears 32 and 33 so that the idler gear 31 is in mesh with a retractor gear 38 at such times as gear 31 is also in mesh with a reel gear 32 or 33. Although the clutch assemblies 34 and 36 are located adjacent the perimeter of the reel gears 32 and 33 their location is such that the retractor gears 38 are not in mesh with the reel gears 32 and 33, in other words suitable clearance is provided between the teeth of the retractor gears 38 and the idler gears 32 and 33. It will now be apparent, to those skilled in the art, that the idler gear 31 utilizes the teeth of the retract gears 34 to effect a positive unmeshing operation with respect to the reel gears 32 and 33 even though an overhauling load as mentioned above does occur.

The apparatus 11 may be operated with the idler gear 31 in full meshing relation with the take-up reel gears 32 and 33. However, the operation of the apparatus 11 under these conditions may cause a slight variation in the angular velocity of the reels 14 and 16 which will result in flutter in the tapes 26 and 27 and resulting distortion in reproducing signals recorded thereon.

Variations in angular velocities of the reels 14 and 16 as discussed above can be overcome by fixing the center distances between the idler gear 31 and the reel gears 32 and 33 at such time as the former gear is in mesh with either of the latter gears. Constant distances, between the idler gear 31 and the reel gears 32 and 33, are maintained by providing disks 41 and 42 on the idler gear 31 and reel gears 32 and 33, respectively as shown in FIGURE 5. The diameters of the disks 41 and 42 are equal to the pitch diameter of the gear to which they are respectively attached. Since the pitch diameter of any gear constitutes its theoretical rolling diameter, pure rolling occurs between the disks 41 and 42. Accordingly the disks 41 and 42 function to effectively dampen out any variations in angular velocity in the reels 14 or 16 which otherwise might occur due to crowding or overmeshing to the teeth of the gears 31, 32 and 33. Also, inasmuch as pure rolling occurs between the disks 41 and 42 wear of these components is minimized.

The various components of the drive mechanism 23 having been described its operation will be better understood by the following description of its operation. Referring to FIGURE 4, here an electrical circuit which may be utilized to actuate the drive mechanism 23 through its angular range is shown.

Electrical current is supplied to the motor 22 by a power source (not shown) and is controlled by an "on-off" switch 43. As previously mentioned the warning apparatus 11 may be utilized in an aircraft in which case the "on-off" switch 43 will be actuated by any one of a plurality of warning sensors (not shown). The "on-off" switch, however, may be actuated by other means if the drive mechanism 23 is utilized in installations other than aircraft.

For purposes of illustration it is assumed that the motor 22 rotates in a clockwise direction when the "B" pole of the motor is negative. Accordingly the reversing switch 44 will be in the position shown by solid line construction in FIGURE 4 and current will flow to the motor 22 through the connectors 46 and 47 and be returned by the connectors 48 and 49. Clockwise rotation of the motor 22 causes the yoke member 28 to pivot in a clockwise direction, the latter assuming the position shown by phantom line construction and identified by the numeral 28*a*, causing the idler gear 31 to mesh with the reel gear 32 and drive the reel 14.

Assuming now that the tape 26 has been completely wound on the reel 14 a conventional limit switch (not shown) functions to actuate a reversing switch 44 to the position shown by broken line construction in FIGURE 3. It will now be seen that the polarity of the motor 22 is reversed, the yoke member 28 will be swung in a counterclockwise direction to the position shown by broken line construction and identified by the numeral 28*b*, the idler gear 31 will be urged into meshing relation with the reel gear 33 and the reel 16 will now be driven. The retractor gear 36 aids and insures a positive unmeshing action as the idler gear 31 unmeshes from the reel gear 32 in a manner previously explained.

At such times as signals are no longer forthcoming from the aforementioned warning sensors or the like the "on-off" switch 43 is urged to its "off" position as shown by broken line construction in FIGURE 3. Under such conditions it is desirable that the drive mechanism 23 be positioned in its neutral range so that both of the tapes 26 and 27 may be returned to their initial or starting positions. To accomplish this feature a pair of microswitches 51 and 52 are provided and mounted on the frame 12 as shown in FIGURES 2 and 4. As mounted and positioned the switches 51 and 52 are triggered by the aft end of the yoke member 28 at such times as the latter member is located in the extreme ends of its angular range.

Assume that the drive mechanism 23 is located in its drive position 28*b* at such time as senor signals are discontinued and the "on-off" switch 43 has been urged to its "off" position. At this time it will be seen that the plunger of switch 51 is depressed and the plunger of switch 52 extended as shown by solid line construction in FIGURE 4. Accordingly current will momentarily flow to and return from the motor 22 via connectors 53, 54, 56, 57, 59 and 61 reversing the polarity of the motor 22 and causing it to rotate in a clockwise direction. After a finite number of revolutions of the motor 22 in a clockwise direction the circuit between connectors 57 and 59 will be broken and the motor 22 deenergized. Accordingly the yoke member 28 will come to rest in its neutral position, the idler gear 31 will be disengaged from the reel gear 32 (also the reel gear 33) and will remain so until the "on-off" switch is again placed in its "on" position. Similar action, functioning to position the drive mechanism 23 in its neutral position, will occur should the yoke member 28 be in a position depressing the plunger of switch 52 at such time as signals to the apparatus 11 are discontinued and the "on-off" switch is urged to its "off" position.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A drive mechanism adapted to alternately impart rotary movement to a pair of spaced rotatable driven gears comprising a support structure; a reversible type rotary motor mounted on said support structure; a driving gear mounted on the output member of said motor for rotation therewith; an idler gear; yoke means mounted on said output member for pivotal movement thereon through an angular range in response to the rotation of said output member; said idler gear being mounted on said yoke means at a position in which the teeth of said idler gear mesh with the teeth of said driving gear and said idler gear functions to drive one and then the other of said driven gears at such times as said yoke means is located at the respective ends of its angular range; and limiting means mounted on each of said driven gears and said idler gear limiting the extent of contact of the teeth of said idler gear with respect to said driven gears.

2. A drive mechanism as set forth in claim 1; further characterized in that said limiting means constitutes circular disks the diameters of which are equal to the pitch diameters of the gears on which they are respectively mounted.

3. A drive mechanism adapted to independently impart rotary movement to a pair of spaced rotatable driven members, comprising: a support structure for carrying the driven members; a reversible rotary motor mounted on said support structure and having an output member; a driving member mounted on said output member for rotation therewith; yoke means mounted on said output member for pivotal movement thereon through a predetermined angular range in response to rotation of said motor; an idler member rotatably mounted on said yoke means at a position whereby said idler member is driven by said driving member causing said idler member to drive one and then the other of the driven members at such times as said yoke means is located at the respective ends of its angular range; a pair of retractor members respectively mounted by said support structure between the driven members, adjacent to but not in contact with each respective driven member; said idler member being in driving contact with one of said retractor members when said idler member is in driving position with the adjacent driven member; and unidirectional clutch means connected to each said retractor member allowing said idler member to freely rotate each said retractor member when driving its adjacent driven member, but blocking rotation of each said retractor member in the opposite direction; whereby reversal of said motor from a driving position with either one of the driven members causes positive separation of said idler member from that one driven member.

4. In a drive mechanism wherein a rotary motor drives a rotatable idler member adapted to drivingly engage a driven member, said idler member being mounted in a yoke which is pivoted at the axis of said motor and has a driving position and a neutral position where said idler member is separated from said driven member, disengaging means comprising: a retractor member mounted adjacent to said driven member and in position to be driven by said idler member when the latter is in driving position with said driven member; and unidirectional clutch means connected to said retractor member allowing said idler member to freely rotate said retractor member when driving said driven member in one direction, but blocking rotation of said retractor member in the opposite direction; whereby reversal of said motor from a freely driving condition with said driven member causes positive separation of said idler member from said driven member.

5. Apparatus in accordance with claim 4 wherein said motor is a reversible electric motor, and including a two-position on-off switch for said motor, circuit means connecting the contacts of the "on" switch position to said motor for normal driving thereof, a momentary-contact switch located to be actuated by said yoke when the latter is in its driving position, and circuit means connecting the contacts of the "off" switch position through said momentary-contact switch and said motor to reverse said motor only while said momentary-contact switch is actuated, whereby when said on-off switch is returned to its "off" position said motor will be reversed long enough to cause said retractor member to move said yoke from its driving position to neutral position.

References Cited in the file of this patent

UNITED STATES PATENTS

| | | |
|---|---|---|
| 2,871,716 | Stade | Feb. 3, 1959 |
| 2,896,873 | Mageoch | July 28, 1959 |